United States Patent
Carroll

(10) Patent No.: US 8,907,516 B2
(45) Date of Patent: Dec. 9, 2014

(54) TETHER HANDLING FOR AIRBORNE ELECTRICITY GENERATORS

(71) Applicant: JST, LLC, Portland, OR (US)

(72) Inventor: Joseph A. Carroll, Chula Vista, CA (US)

(73) Assignee: JST LLC, Portland, OR (US)

( * ) Notice: Subject to any disclaimer, the term of this patent is extended or adjusted under 35 U.S.C. 154(b) by 0 days.

(21) Appl. No.: 13/736,669

(22) Filed: Jan. 8, 2013

(65) Prior Publication Data

US 2013/0140827 A1   Jun. 6, 2013

Related U.S. Application Data

(62) Division of application No. 12/505,308, filed on Jul. 17, 2009, now Pat. No. 8,350,403.

(60) Provisional application No. 61/081,960, filed on Jul. 18, 2008.

(51) Int. Cl.
   *F03D 9/00* (2006.01)

(52) U.S. Cl.
   USPC .............................................. 290/55; 290/44

(58) Field of Classification Search
   USPC ........................... 290/43, 44, 54, 55; 416/248
   See application file for complete search history.

(56) References Cited

U.S. PATENT DOCUMENTS

| | | |
|---|---|---|
| 2,429,502 A | 10/1947 | Young |
| 2,433,344 A | 12/1947 | Crosby |
| 2,472,290 A | 6/1949 | Fernstrum |
| 3,181,810 A | 5/1965 | Olson |
| 3,412,807 A | 11/1968 | Kretz |
| 3,582,025 A | 6/1971 | Richardson |
| 3,782,223 A | 1/1974 | Watson |
| 3,987,987 A | 10/1976 | Payne et al. |
| 4,084,102 A | 4/1978 | Fry et al. |
| 4,166,596 A | 9/1979 | Mouton, Jr. et al. |
| 4,251,040 A * | 2/1981 | Loyd .............................. 244/154 |
| 4,285,481 A | 8/1981 | Biscomb |
| 4,450,364 A | 5/1984 | Benoit |

(Continued)

FOREIGN PATENT DOCUMENTS

| CN | 101004166 | 7/2007 |
|---|---|---|
| DE | 3100085 | 12/1982 |

(Continued)

OTHER PUBLICATIONS

Roberts, "Flying Electric Generator to Harness Jetstream Energy," Space 2000 Conference of the American Society of Engineers; Feb. 2000, pp. 1020-1026; USA.

(Continued)

*Primary Examiner* — Nicholas Ponomarenko
(74) *Attorney, Agent, or Firm* — Dicke, Billig & Czaja, PLLC

(57) ABSTRACT

A power generation system including an airborne electricity generator, a tether assembly configured to carry electricity from the generator to land, the tether assembly having a first end portion coupled to the generator, and a winch assembly configured to reel the tether assembly onto a drum, wherein the winch assembly is configured to apply a reel tension to the tether assembly reeled onto the drum that is lower than a tension in the first end portion of the tether assembly.

16 Claims, 16 Drawing Sheets

(56) References Cited

U.S. PATENT DOCUMENTS

| | | | |
|---|---|---|---|
| 4,486,669 A | 12/1984 | Pugh | |
| 4,659,940 A | 4/1987 | Shepard | |
| 4,685,354 A | 8/1987 | McCabria | |
| 5,040,948 A | 8/1991 | Harburg | |
| 5,419,683 A | 5/1995 | Peace | |
| 5,435,259 A | 7/1995 | Labrador | |
| 5,807,202 A | 9/1998 | Sammataro | |
| 6,064,123 A | 5/2000 | Gislason | |
| 6,073,510 A | 6/2000 | Tomaselli | |
| 6,254,034 B1* | 7/2001 | Carpenter | 244/153 R |
| 6,304,002 B1 | 10/2001 | Dehlsen et al. | |
| 6,523,781 B2 | 2/2003 | Ragner | |
| 6,612,195 B2 | 9/2003 | Gmirya et al. | |
| 6,672,539 B1 | 1/2004 | Schoeneck | |
| 6,726,439 B2 | 4/2004 | Mikhail et al. | |
| 6,731,017 B2 | 5/2004 | Mikhail et al. | |
| 6,781,254 B2 | 8/2004 | Roberts | |
| 6,923,622 B1 | 8/2005 | Dehlsen | |
| 6,951,443 B1 | 10/2005 | Blakemore | |
| 6,955,025 B2 | 10/2005 | Dehlsen et al. | |
| 6,998,723 B2 | 2/2006 | Kong et al. | |
| 7,002,259 B2 | 2/2006 | Howes et al. | |
| 7,032,681 B1 | 4/2006 | Sprakel | |
| 7,042,110 B2 | 5/2006 | Mikhail et al. | |
| 7,069,802 B2 | 7/2006 | Mikhail et al. | |
| 7,095,131 B2 | 8/2006 | Mikhail et al. | |
| 7,095,597 B1 | 8/2006 | Cousineau | |
| 7,109,598 B2 | 9/2006 | Roberts et al. | |
| 7,129,596 B2* | 10/2006 | Macedo | 290/55 |
| 7,183,663 B2 | 2/2007 | Roberts et al. | |
| 7,188,808 B1* | 3/2007 | Olson | 244/153 R |
| 7,275,719 B2 | 10/2007 | Olson | |
| 7,317,261 B2* | 1/2008 | Rolt | 290/55 |
| 7,335,000 B2 | 2/2008 | Ferguson | |
| 7,399,162 B2 | 7/2008 | Williams | |
| 7,602,077 B2* | 10/2009 | Ferguson | 290/55 |
| 7,675,189 B2* | 3/2010 | Grenier | 290/54 |
| 7,847,426 B1 | 12/2010 | Griffith et al. | |
| 7,859,126 B2 | 12/2010 | Ferguson | |
| 8,066,225 B1 | 11/2011 | Tigner | |
| 8,080,889 B2* | 12/2011 | Ippolito et al. | 290/44 |
| 8,247,912 B2* | 8/2012 | Da Costa Duarte Pardal et al. | 290/44 |
| 8,350,403 B2* | 1/2013 | Carroll | 290/55 |
| 2003/0136875 A1 | 7/2003 | Pauchard | |
| 2005/0098162 A1 | 5/2005 | Bryant | |
| 2008/0048453 A1 | 2/2008 | Amick | |
| 2009/0278353 A1* | 11/2009 | Da Costa Duarte Pardal et al. | 290/44 |
| 2010/0013236 A1 | 1/2010 | Carroll | |
| 2011/0266809 A1* | 11/2011 | Calverley | 290/55 |
| 2012/0086210 A1* | 4/2012 | Gray | 290/55 |

FOREIGN PATENT DOCUMENTS

| | | |
|---|---|---|
| EP | 0391601 | 10/1990 |
| JP | 2002320345 | 10/2002 |
| JP | 200498721 | 4/2004 |
| JP | 2007504399 | 3/2007 |
| RU | 2159199 | 11/2000 |
| WO | 2008086608 | 7/2008 |
| WO | 2009006287 | 1/2009 |

OTHER PUBLICATIONS

Roberts et al., "Harnessing High-Altitude Wind Power," Energy Conversion, IEEE Transaction on Mar. 2007, vol. 22, Issue 1, pp. 136-144.

PCT Search Report, Oct. 20, 2010, 12 pages.

PCT Search Report, Nov. 12, 2010, 9 pages.

The International Preliminary Report on Patentability for International Application No. PCT/US2009/051053 mailed Jan. 27, 2011 (8 pages).

The Restriction Requirement for U.S. Appl. No. 12/505,308 mailed Dec. 6, 2011 (4 pgs.).

The Office Action for U.S. Appl. No. 12/505,308 mailed Mar. 9, 2012 (13 pgs.).

The Notice of Allowance for U.S. Appl. No. 12/505,308 mailed Sep. 7, 2012 (7 pgs.).

* cited by examiner

TETHER HANDLING FOR AIRBORNE ELECTRICITY GENERATORS

CROSS-REFERENCE TO RELATED APPLICATIONS

This Divisional Patent Application claims priority from U.S. patent application Ser. No. 12/505,308, filed Jul. 17, 2009, entitled: HANDLING TETHERS FOR AIRBORNE ELECTRICITY GENERATORS and U.S. Provisional Patent Application No. 61/081,960, filed Jul. 18, 2008, entitled: HANDLING TETHERS FOR AIRBORNE ELECTRICITY GENERATORS, both of which are herein incorporated by reference.

BACKGROUND

Fossil fuels are the primary source of energy for the planet. The rate of consumption is likely to outpace the rate of production for fossil fuels as the planet's population continues to grow and as less economically developed countries become industrialized. This expected increase in demand for fossil fuels could exhaust the global supplies of fossil fuels within the next several decades unless new sources of energy are located.

It is desirable to harness energy from renewable sources such as solar power, wind power, hydro power, and/or geothermal power to minimize dependence on fossil fuels.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part of this specification, and in which is illustrated specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration only and is in no way limiting. It is to be understood that other embodiments may be utilized and structural or logical changes may be made without departing from the scope of the disclosure. The following Detailed Description teaches exemplary embodiments that are not to be taken in a limiting sense.

It is to be understood that features of the various exemplary embodiments described herein may be combined with each other, unless specifically noted otherwise.

Embodiments provide a power generation system including an airborne electricity generator, a tether assembly attached to the generator and configured to carry electricity from the generator to land, and a winch assembly employed to deploy and retrieve the tether assembly and the airborne electricity generator. One embodiment of the winch assembly is configured to reel the tether assembly onto a drum in a manner that the wound portion of the tether assembly has a lower tension than the portion of the tether assembly that is attached adjacent to the airborne electricity generator. Low tension winding of the tether assembly can significantly extend its useful life.

Embodiments provide a clamping mechanism that is configured to immobilize the tether assembly while minimizing the wear imparted to the tether assembly. Embodiments of the winch assembly in combination with the clamping mechanism are configured to modulate the tension along the length of the tether assembly and monitor and minimize the wear imparted to the tether assembly.

The mechanical load cycles of the tether assembly will potentially heat and expand the tether assembly. In some embodiments, the tether assembly includes multiple cables that are potentially heated/expanded by different amounts, and a methodology is taught for handling the current-carrying tether assembly with low winding tension in a manner that minimizes wear to the tether assembly during mechanical load cycling (reeling in, reeling out, etc).

Figure 1:
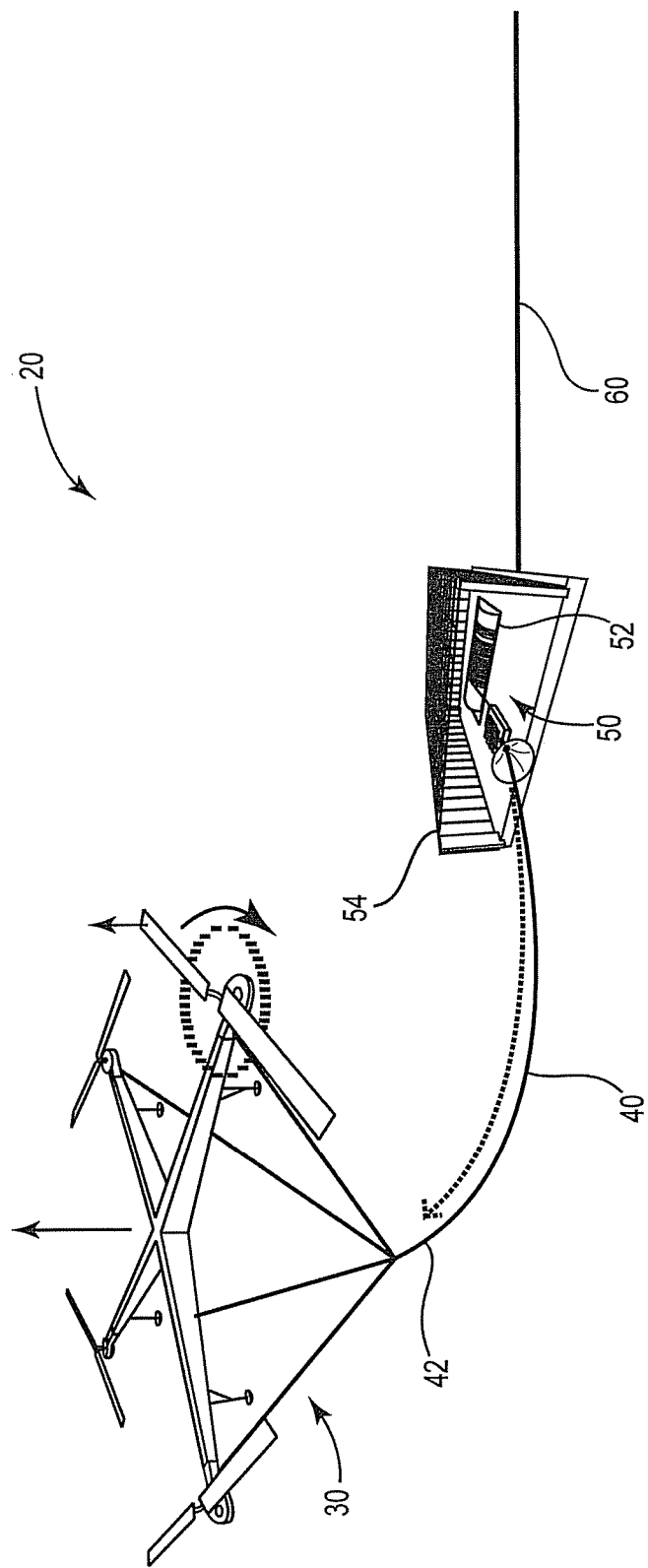
FIG. 1 is a perspective view of a power generation system including a tether assembly attached between an airborne electricity generator and a winch assembly according to one embodiment.

FIG. 1 is a perspective view of a power generation system 20 (system 20) according to one embodiment. System 20 includes an airborne electricity generator 30 (generator 30) and a tether assembly 40 attached between generator 30 and a winch assembly 50. Tether assembly 40 includes a first end portion 42 coupled to generator 30 and is configured to carry electricity from generator 30 down to a land based power grid 60. Winch assembly 50 is configured to reel tether assembly 40 onto a drum 52 such that the reel tension applied to the tether assembly 40 reeled onto drum 52 is lower than the tension in the first end portion 42 of tether assembly 40. In one embodiment, the high voltage components of system 20 are protectively enclosed within a cage 54 disposed around winch assembly 50.

Generator 30 is configured to remove power from grid 60 and take-off from a land-based site, fly under powered flight to a deployment altitude, transition to a suitable altitude for efficiently generating electricity that is provided to grid 60, and descend under controlled flight to land back at the land-based site. In one embodiment, generator 30 flies at an electricity generating altitude of approximately 30,000 feet and conducts electricity through tether assembly 40 back to the land-based power grid.

Tether assembly 40 is coupled to generator 30 and is configured to conduct electricity from the airborne generator 30 down to the land-based power grid 60. In one embodiment, tether assembly 40 has a length suitable to enable generator 30 to fly to a deployment altitude of approximately 45,000 feet prior to transitioning to the electricity generating altitude of approximately 30,000 feet. In one embodiment, tether assembly 40 has a length of less than approximately 60,000 feet, with one suitable length for tether assembly 40 being between approximately 40,000-50,000 feet.

Winch assembly 50 is configured to reel tether assembly 40 in a controlled and low-tension manner onto drum 52. Winch assembly 50 is configured to handle tether assembly 40 by selectively immobilizing tether assembly 40 (e.g., clamping tether assembly 40) such that generator 30 is tethered to the ground for flight at the desired altitude. Winch assembly 50 is configured to handle tether assembly 40 (e.g., control the winding tension and monitor the clamping) in a manner that minimizes wear imparted to tether assembly 40.

In one embodiment, grid 60 provides power that enables generator 30 to lift-off and fly up to altitude. When at altitude, generator 30 transitions to an electricity generating mode and generates an excess of electricity beyond that employed for flight. The excess electricity generated by generator 30 is conducted along tether assembly 40 back to grid 60 and can be usefully employed to power homes and businesses.

Figure 2A:
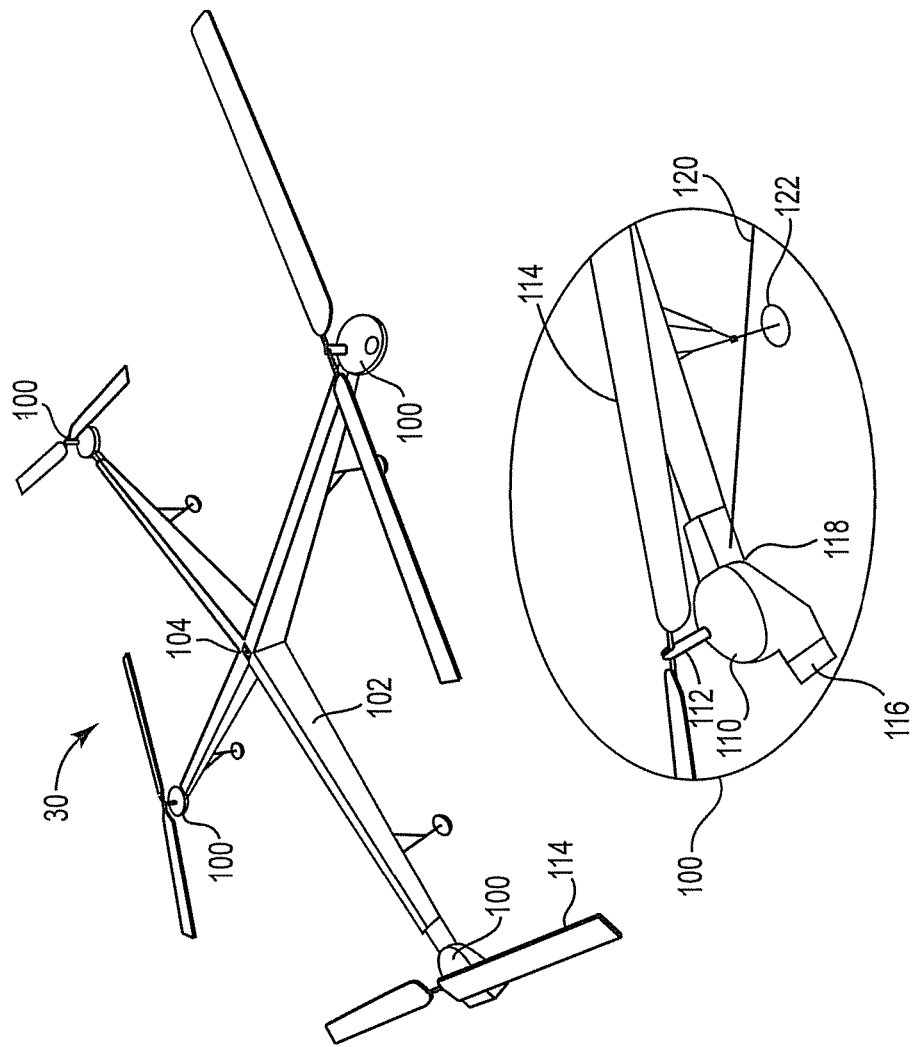
FIG. 2A provides multiple perspective views of one embodiment of the airborne electricity generator illustrated in FIG. 1.

FIG. 2A provides multiple prospective views of one suitable airborne electricity generator 30 according to one embodiment. Embodiments of the systems and the methods for handling tethers for airborne electricity generators can be employed with any suitable airborne electricity generator, such as lighter-than-air flying electricity generators, electricity generating blimps and kites and the like, flying windmill electricity generators, or rotorcraft electricity generators. The embodiments described herein of airborne electricity generators 30 provide just some examples of suitable airborne electricity generators that may be usefully handled by tether assembly 40 and winch assembly 50. The following description of airborne electricity generator 30 is not intended to limit the style of type of airborne electricity generators that may be employed within system 20.

In one embodiment, generator 30 includes one or more electric motor/generator modules 100 (modules 100) coupled to a frame 102. Modules 100 are configured to electrically communicate with each other through a control system 104 maintained within frame 102. In one embodiment, each module 100 includes a pod 110 housing an electricity generator, a hub 112 coupled to the electricity generator, a rotor 114 extending from hub 112, a control surface such as rudder 116, and a tether bridle 118 coupled to pod 110. In one embodiment, each motor/generator module 100 is configured to provide approximately 1 MW at 25,000 volts.

Frame 102 is configured to provide a high strength-to-weight ratio that is configured to support generator 30 without unduly weighing down generator 30. Other configurations for frame 102 having a high strength-to-weight ratio are also acceptable. In one embodiment, frame 102 is designed to optimize and balance cost, weight, strength, stiffness, and drag. Drag induced by frame 102 can create an airflow disturbance hitting the blades, which are "downwind" from the frame except during powered climb, and flow disturbances both complicate the dynamics and control, and increase fatigue on the rotating equipment. In one embodiment, frame 102 employs cylindrical frame elements large enough in diameter (0.5 meters or more) to enable flight at a cross-flow Reynolds number of greater than 400,000. This changes air flow in a manner that reduces frame drag (and downwind flow disturbance) by a factor of about 4.

In one embodiment, control system 104 includes a computer memory operating software that communicates with motors, servo-motors, controllers, actuators, or the like that are employed to maneuver modules 100 and receive data from modules 100, for example via a feedback loop, useful in controlling modules 100.

Pod 110 generally provides an aerodynamically-shaped housing configured to enclose components of the electricity generator. Rotation of rotor 114, for example by an oncoming wind stream, rotates hub 112, which rotates one or more gears of the electricity generator to spin motor/generators (inside pod 110) that generate electricity.

In one embodiment, rotor 114 includes counter-rotating autogyro rotors, although other suitable configurations for rotor 114 are also acceptable.

In one embodiment, hub 112 is configured to provide rotors 114 with collective pitch control in which each rotor 114 of each module 100 is configured to rotate with the same instantaneous angle of attack. In another embodiment, hub 112 is configured to provide rotor 114 with differential collective pitch control configured to control one or more spaced-apart rotors 114 acting in concert where an adjustment in the angle of attack in one rotor 114 is followed by a simultaneous decrement of the other rotor 114 by a corresponding effective amount. Other suitable methods of operating rotors 114, including controls and methodologies employed to control helicopter rotors, are also acceptable.

In one embodiment, rudder 116 is provided to control a desired orientation of each module 100, and thus generator 30. In one embodiment, tether bridle 118 provides an attachment point for securing tether assembly 40 (FIG. 1) to module 100. In one embodiment, tether bridle 118 is configured to bear the aerodynamic loadings of generator 30 and provide an electrical pathway from electricity generator 30 down to the land-based grid 60 (FIG. 1).

In one embodiment, stabilizing tension wires 120 are optionally provided and coupled to frame 102 to stabilize generator 30 during flight. In one embodiment, landing gear 122 is coupled to frame 102 adjacent to each module 100. Landing gear 122 is configured to provide shock absorption and leveling for generator 30 to enable landing generator 30 on somewhat uneven surfaces.

Figure 2B:
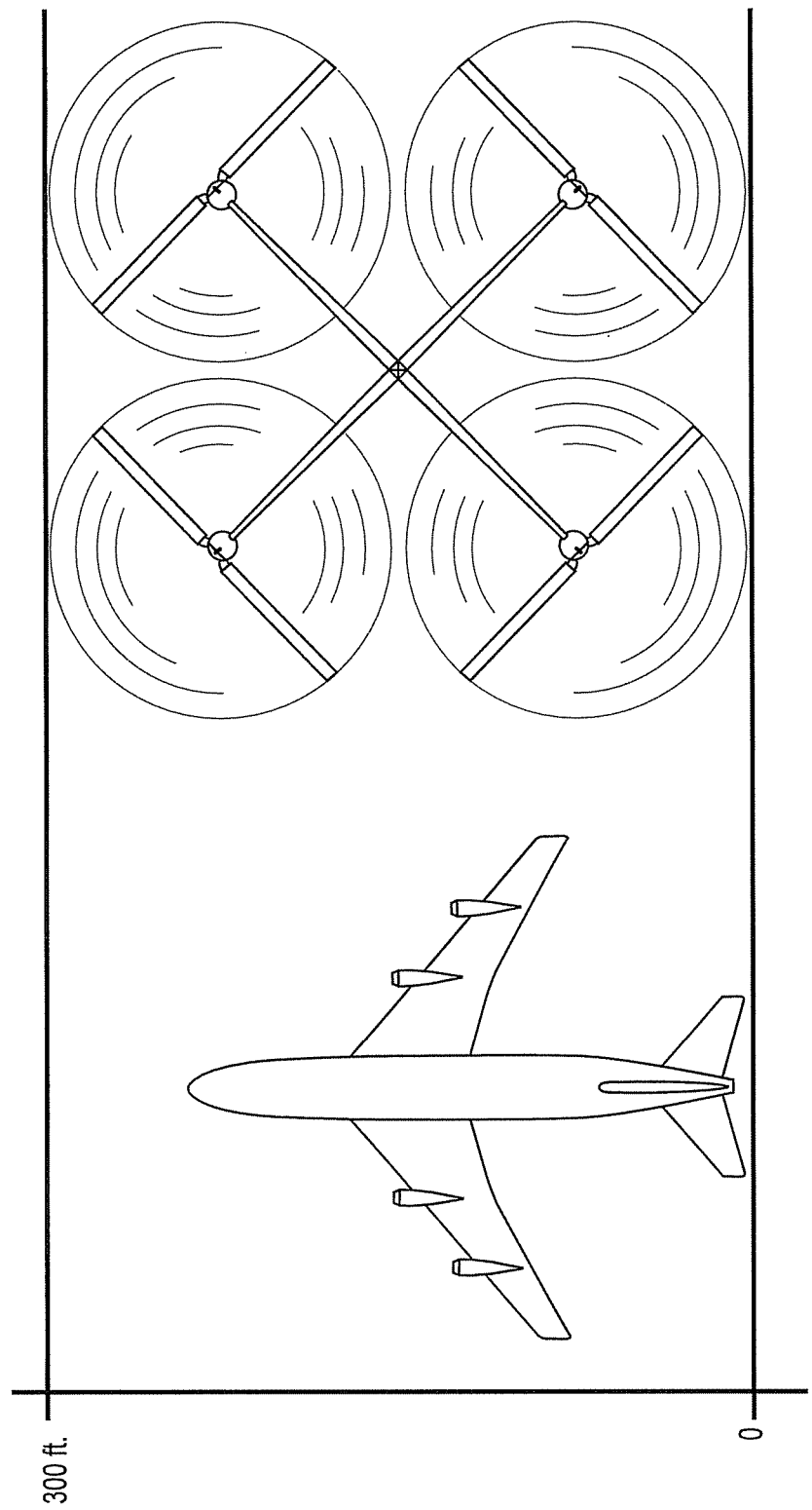
FIG. 2B is a top view of the airborne electricity generator in comparison to a Boeing 747-400 according to one embodiment.

FIG. 2B provides comparative top views of generator 30 in relation to a Boeing 747-400. In one embodiment, each rotor 114 has a diameter of approximately 142 feet such that a constructive wing span for generator 30 is greater than the wing span of a Boeing 747-400, which is about 211 feet.

Figure 3A:
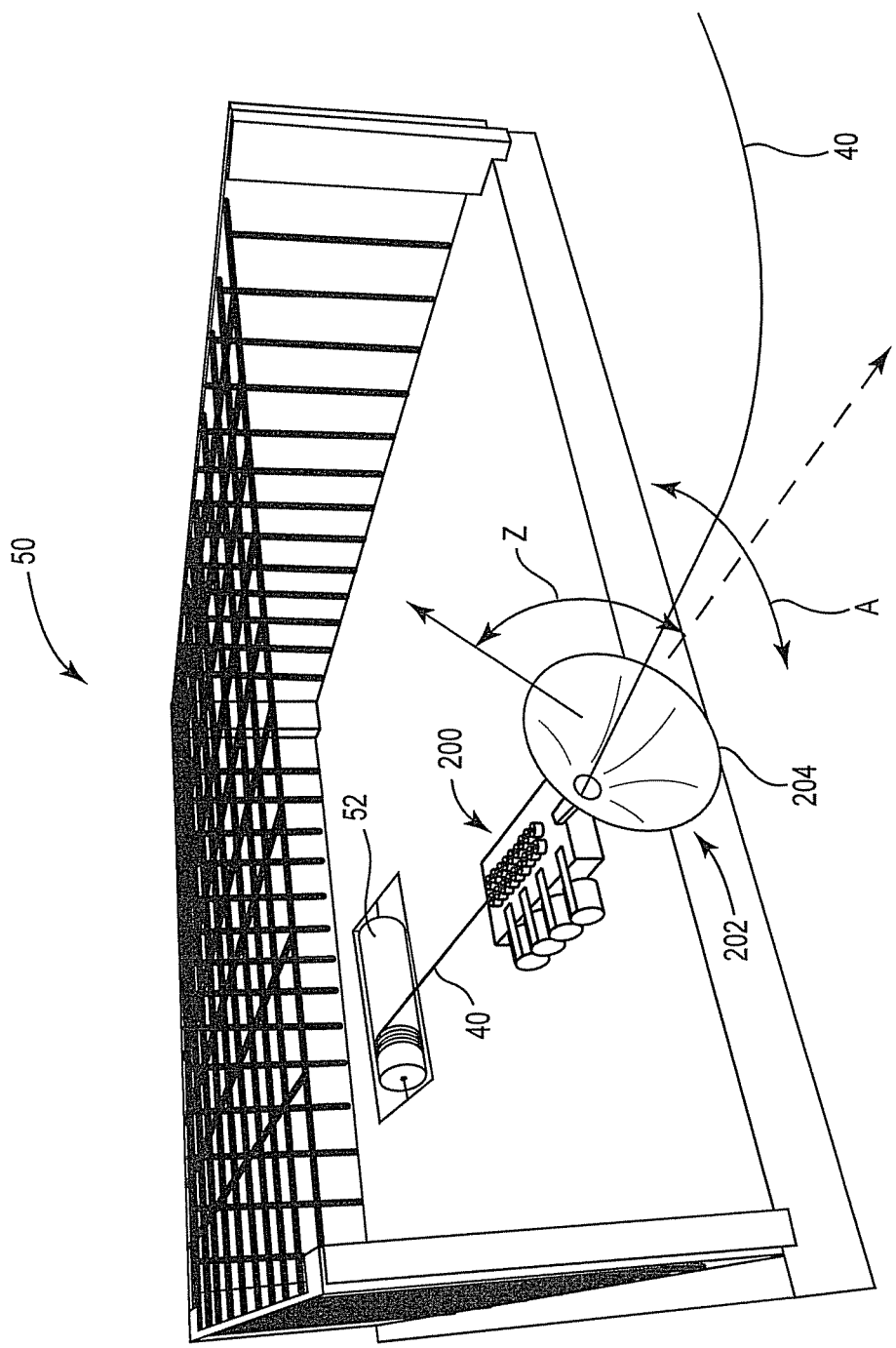
FIG. 3A is a perspective view of one embodiment of a winch assembly.

FIG. 3A is a perspective view of winch assembly 50 according to one embodiment. Winch assembly 50 includes winding drum 52, a table 200 mounted outboard of drum 52, and a transition assembly 202 disposed at an entrance of table 200 opposite of drum 52. In one embodiment, table 200 is configured to relieve the tension in tether assembly 40 before or concurrent with tether assembly 40 being wound onto drum 52. Transition assembly 202 is configured to align/maintain an angle of tether assembly 40 relative to table 200 (e.g., winch assembly angle A of FIG. 14) that is selected to minimize the tension in tether assembly 40 as it enters table 200.

In one embodiment, drum 52 is driven by an electric motor configured to control the tension that is imparted to tether assembly 40 as it is wound onto drum 52. Drum 52 is illustrated as being maintained in a drum recess or pit. This is but one acceptable orientation for drum 52, as other configurations, such as above-ground configurations, are also acceptable.

In one embodiment, transition assembly 202 includes a funnel-shaped bell 204 and is moveable relative to table 200 through azimuth angles A of between approximately 0-270 degrees and zenith angles of between approximately 10-90 degrees. In one embodiment, at least bell 204 is moveable and configured to align with the flight direction of generator 30 (FIG. 1) such that tether assembly 40 is aligned with table 200 and drum 52. In one embodiment, bell 204 is configured such that tether assembly 40 is provided with an approximately horizontal level-wind reel angle (e.g. reel angle B of FIG. 14) as tether assembly 40 is retrieved by drum 52.

Figure 14:
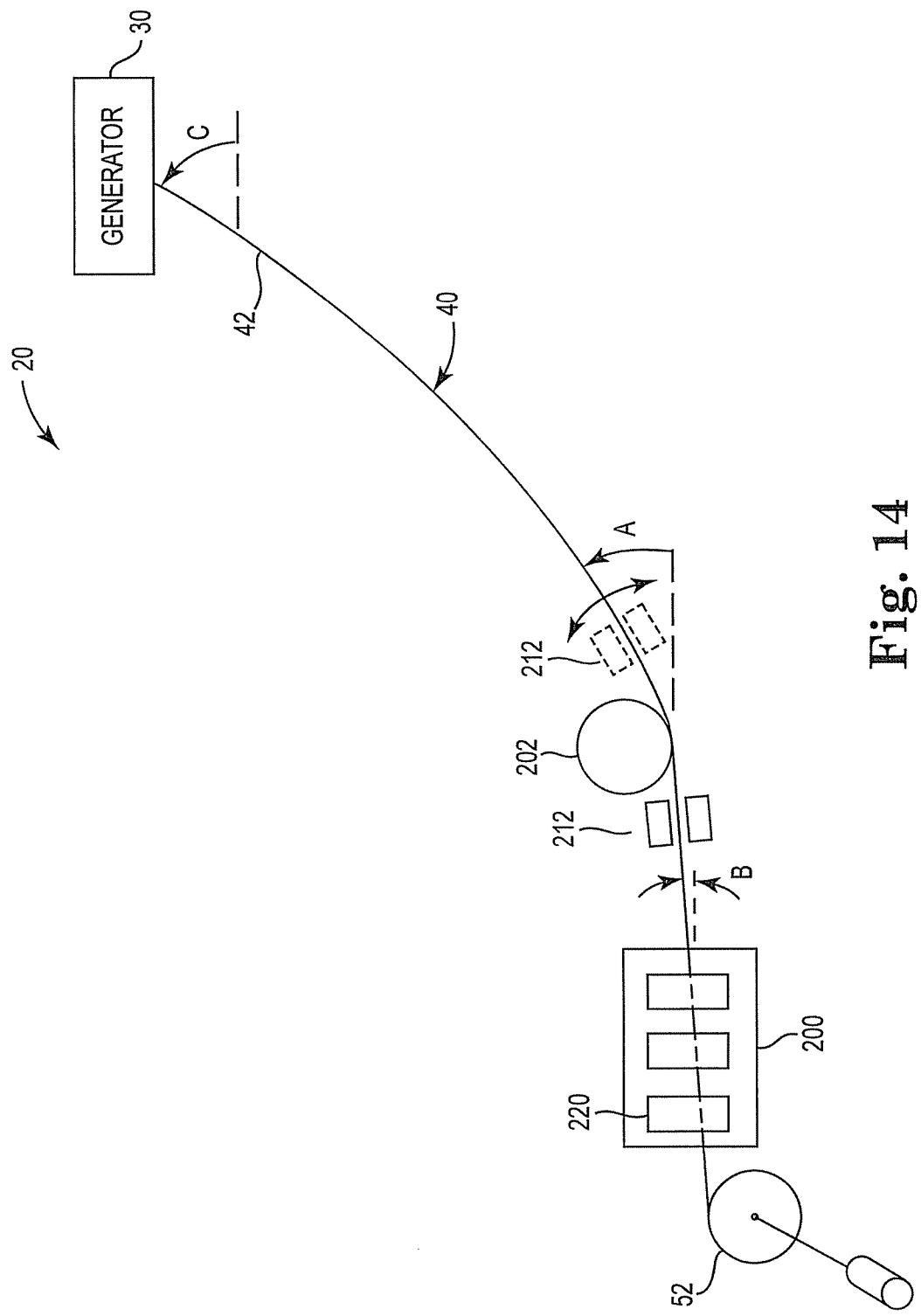
FIG. 14 is a schematic diagram generally illustrating a power generation system including a tether assembly attached between an airborne electricity generator and a winch assembly according to one embodiment.

In one embodiment, transition assembly 202 is configured to maintain tether assembly 40 in a catenary orientation in which tension along tether assembly 40 is minimized by providing a relatively low cable departure angle for tether assembly 40 as it enters transition assembly 202 (e.g. winch assembly angle A of FIG. 14). The cable departure angle is defined as the angle of the tether assembly 40 relative to the horizontal as it approaches the transition assembly 202. A catenary is the shape of a hanging flexible chain/rope/cable that is supported on its ends and acted on by a uniform gravitational force (i.e., the weight of the tether). The portions of the catenary having zero or near zero slope are associated with the segments of the catenary that support the least amount of weight in the structure. Bell 204 is disposed at the bottom end of the catenary formed by the hanging tether assembly 40. In this manner, tension in tether assembly 40 is minimized as tether assembly 40 comes within 0-10 degrees of horizontal as it enters table 200 (e.g., reel angle B of FIG. 14). In other words, according to embodiments the tension in tether assembly 40 is minimized for small zenith entrance angles Z (e.g., reel angle B of FIG. 14) that are non-zero but near zero degrees.

In one embodiment, winch assembly 50 is provided in multiple discrete components that are configured to be transported over public roads in a road-legal manner. In one embodiment, winch assembly 50 is provided in three road-legal components including drum 52, table 200, and transition assembly 202.

In one embodiment, winch assembly 50 is mounted on a rotating roundtable or lazy-Susan device that enables winch assembly 50 to rotate about a vertical axis by up to 360 degrees to align table 200 and drum 52 with tether assembly 40 during winding.

Figure 3B:
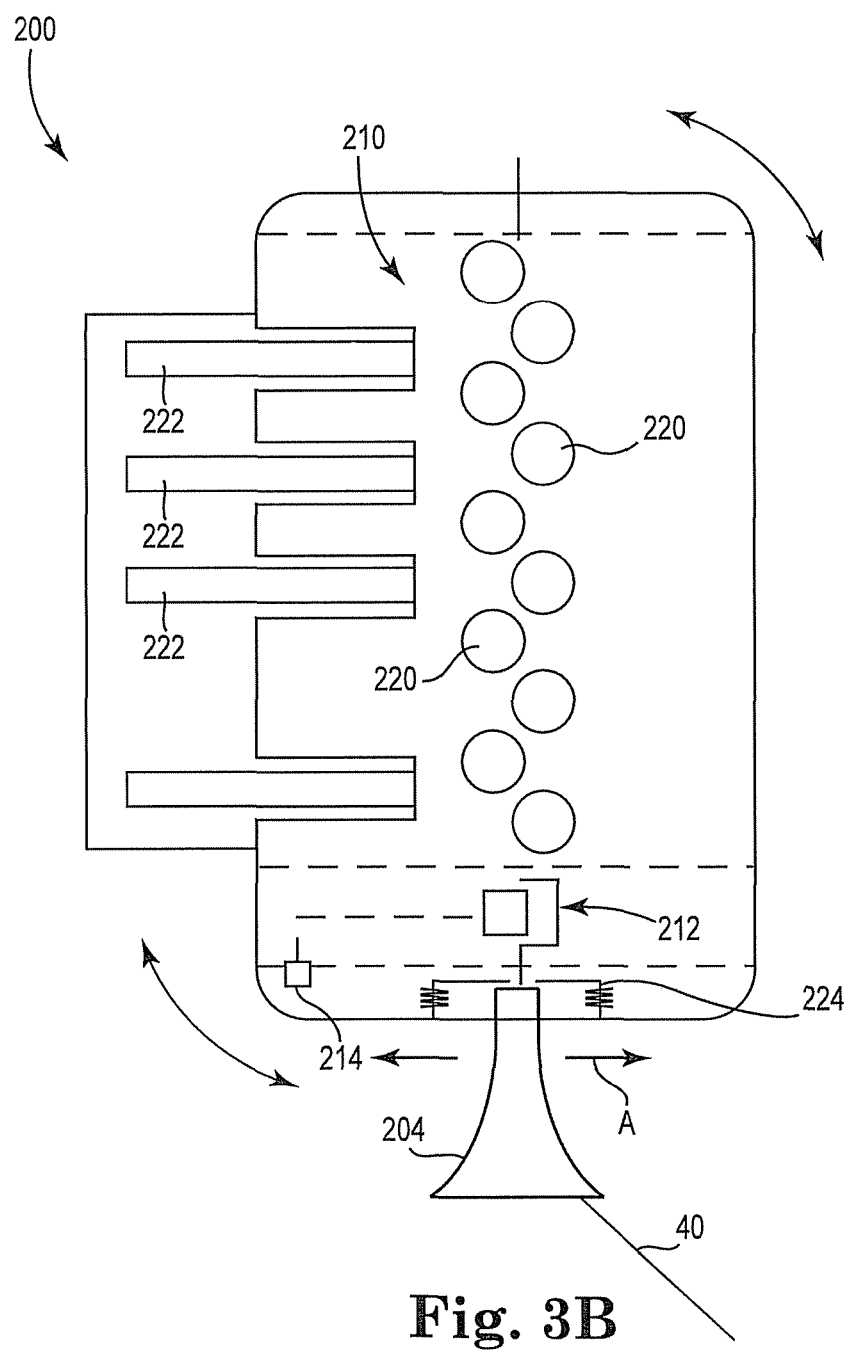
FIG. 3B is a top view of a table of the winch assembly illustrated in FIG. 3A.

FIG. 3B is a top view of table 200. Table 200 includes a fraction drive 210, a clamping assembly 212, and a controller 214 communicating with clamping assembly 212. Table 200 provides traction drive 210 to adjust and minimize tension within tether assembly 40, and controller 214 and clamp 212 are provided to monitor and evenly distribute physical wear applied to tether assembly 40.

Traction drive 210 includes rollers 220 controlled and driven by motors 222. Rollers 220 are configured to frictionally grasp tether assembly 40 and relieve the tension in tether assembly 40 as it moves through table 200 and is wound onto drum 52 (FIG. 3A). In one embodiment, motors 222 are electric motors configured to damp or otherwise adjust tension applied from rollers 220 to tether assembly 40.

In one embodiment, clamping assembly 212 includes jaws that immobilize tether assembly 40 by clamping onto the sides of tether assembly 40. It is desirable to clamp tether assembly 40 in place to hold generator 30 (FIG. 1) at a desired electricity-producing altitude. It is also desirable to clamp tether assembly 40 to maintain generator 30 in flight while drum 52 or a portion of tether assembly 40 is replaced and/or repaired. Clamping assembly 40 has the potential to wear or fray tether assembly 40 during use. In one embodiment, controller 214 includes a computer-operated memory and is configured to record and store/recall a clamping location of clamping assembly 212 along tether assembly 40. By monitoring with controller 214 the locations along tether assembly 40 that have been subjected to clamping, it is possible to minimize wear along tether assembly 40 by distributing clamping forces to portions of tether assembly 40 that have not been previously clamped. In other words, according to embodiments the clamping assembly 212 and controller 214 combine to avoid repeatedly clamping against the same sections of tether assembly 40.

In one embodiment, table 200 optionally includes a dashpot 224 that is configured to damp tether assembly 40 as it moves into bell 204 through traction drive 210. Suitable dashpots include mechanical spring-loaded dashpots, viscous dampened dashpots, or polymeric vibration dampeners.

Figure 4:
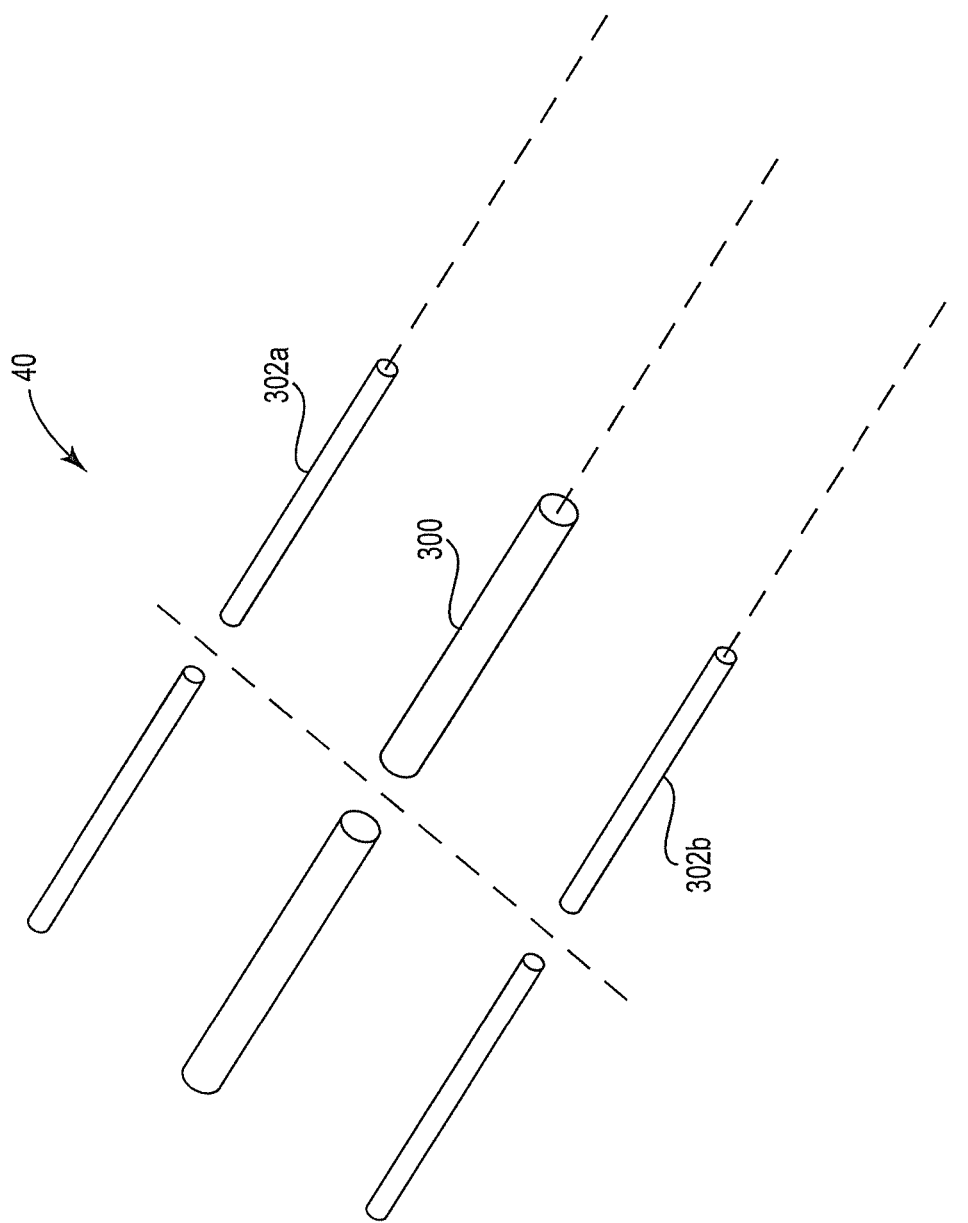
FIG. 4 is a perspective view of one embodiment of cables of a tether assembly, such as illustrated in FIG. 1.

FIG. 4 is a perspective view of one embodiment of cables of tether assembly 40. In one embodiment, tether assembly 40 includes a load-bearing cable 300, a first conductor 302a, and a second conductor 302b. Other configurations, including other numbers and styles of cables, are also acceptable. At least one load-bearing cable 300 is employed to tether airborne electricity generator 30 (FIG. 1) at altitude and retrieve generator 30 as it lands. In one embodiment, cable 300 is a Vectran or similar high strength cable having a mass per unit length of approximately 0.8 pounds per foot and is configured to carry approximately 80% of the force or load in deploying generator 30. Other suitable cables are also acceptable including carbon fiber reinforced cables, pultruded cables and other suitably high tensile cables.

Conductors 302a, 302b (conductors 302) are configured to carry electricity between generator 30 and grid 60 (FIG. 1). One suitable conductor 302 has a mass per unit length of 0.25 pounds per foot and each conductor 302 is configured to carry approximately 10% of the load or force of generator 30. Suitable materials for conductors 302 include aluminum, copper, alloys of aluminum, alloys of copper, or other suitable electrically conducting materials.

Table I below represents physical characteristics of cable(s) 300 and conductors 302. In general, cable 300 carries a large portion of the load and has a greater mass per unit length. For example, in one embodiment conductive cables 302a and 302b are lighter (each ~⅓ the weight of cable 300), moderately denser, and thinner (each <½ the diameter and drag of cable 300). When formed of aluminum, the aluminum in conductive cables 302 accounts for roughly half the cable weight but very little of the strength. When formed of graphite/epoxy, the graphite/epoxy or other low-stretch strength material appropriate for conductive cables 302 typically has a higher cost and weight for the same allowable load, so the cables are operated with about twice the sag of cable 300. Conductive cables 302a and 302b may cost roughly twice as much per pound as the main strength cable 300, and hence may cost more than cable 300, despite having a lower combined weight. In addition, the allowable load cycle life may be less for cables 302 than cable 300.

Tether assembly 40 is approximately 45,000 feet long and conductors 302 sag more than cable 300. For this reason, it is desirable to provide a winch assembly similar to winch assembly 50 that is configured to independently handle the reeling of cable 300 separate from the reeling of conductors 302, as described below.

The known electromechanical cables present a challenge in that the high-strength materials used have a much larger reasonable design strain than the conductors. In contrast, tether assembly 40 is configured for use over many load cycles where the conductors are maintained in tension, and then when load is relieved, the conductors become slack (this is less of an issue with utility transmission lines, which see nearly static tension loads once deployed). The cyclic loading and resultant slack has the potential to cause handling problems during reeling. Embodiments described herein provide reducing the mechanical load on the conductive cables (to ~10% of the total load for each conductor), which enables a higher strength safety factor for the conductive cables. Reducing the load also allows the use lower-strain, lower-strength/weight graphite core with a more robust Vectran strength member (with much higher design strain) to handle the other ~80% of the load. In this manner, the conductor does not stretch much near the design load, although it may not be optimum from a cost or strength-weight basis. The conductor is configured to have a minimum tension provided by maximized sag. Most of the load is segregated away from the conductor and carried by the higher stretching cables.

TABLE I

| Tether Assembly | Mass/Length (lb/ft) | Load Carrying (%) | Sag (feet) | Cost ($) |
|---|---|---|---|---|
| Cable(s) | 0.8 | 80% | X | Y |
| Conductors (each) | 0.25 | 10% | 2.5X | 0.6Y |

Figure 5:
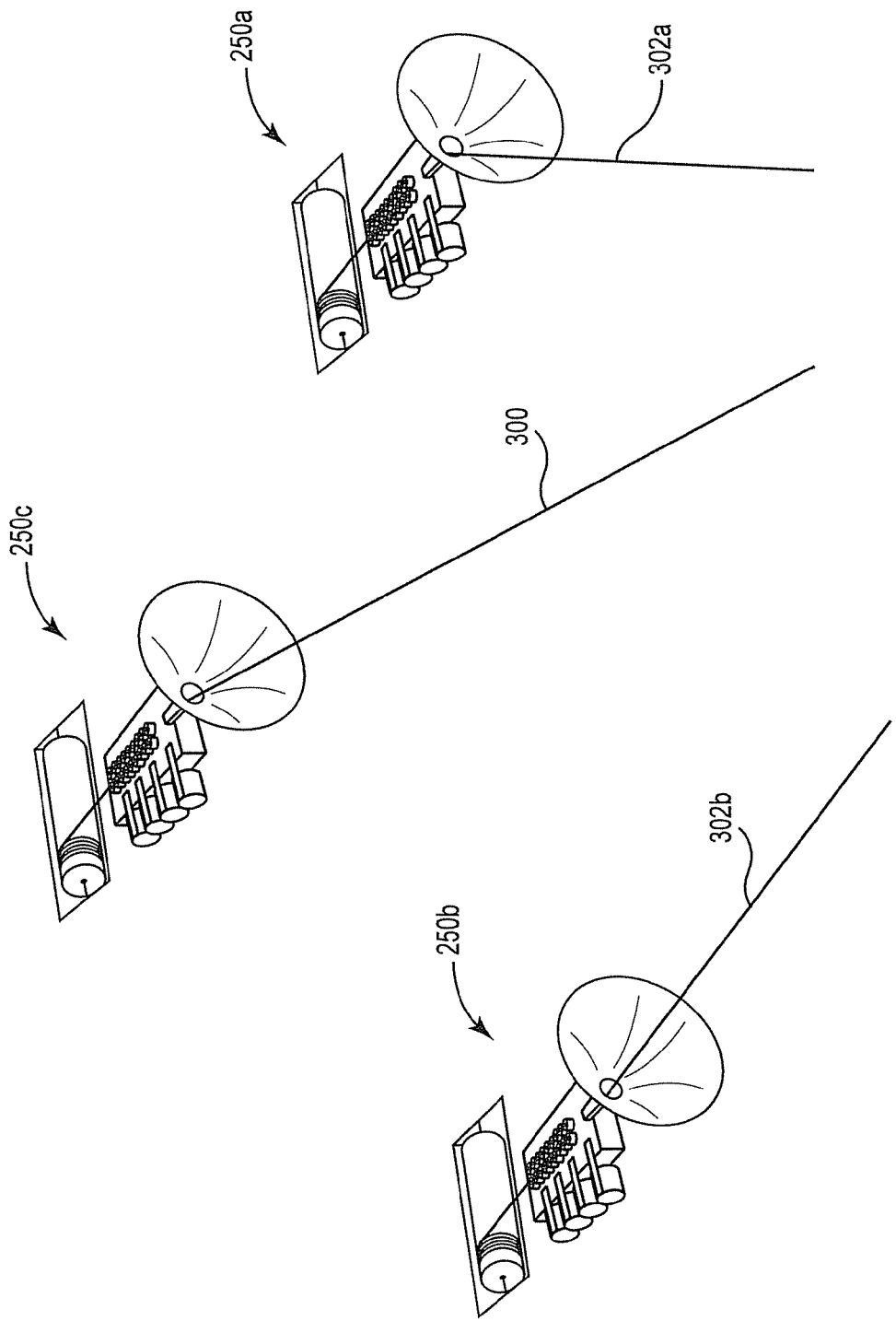
FIG. 5 is a perspective view of embodiments of multiple winch assemblies employed to independently reel the cables shown in FIG. 4 when winding a tether assembly, such as illustrated in FIG. 1.

FIG. 5 is a perspective view of embodiments of three winch assemblies 250a, 250b, 250c employed to independently reel cable 300 and conductor 302a, 302b of tether assembly 40. In one embodiment, each of the winch assemblies 250a, 250b, 250c is similar to winch assembly 50 described above and includes a table providing traction drive(s) and clamping assembly, a transition assembly, and a drum onto which the respective cable or conductor is wound.

In one embodiment, winch assembly 250a is employed to handle conductor 302a and is electrically isolated from winch assembly 250b and winch assembly 250c. In one embodiment, winch assembly 250b is employed to handle conductor 302b and is likewise electrically isolated from winch assembly 250a and winch assembly 250c. In one embodiment, winch assembly 250c is employed to handle cable 300 and is electrically isolated from winch assemblies 250a and 250b. In one embodiment, each of the winch assemblies 250a, 250b, 250c includes its own controller and is configured to retrieve a respective one of the cable or conductor at a rate that is independent of the other winch assemblies. For example, as noted above, conductors 302 sag approximately two-and-a-half times as much as cable 300, and winch assemblies 250a, 250b are configured to reel conductors 302a, 302b at a rate that is greater than the rate that winch assembly 250c reels in cable 300. In one embodiment, cable 300 is reeled in or out in accordance with a defined operating plan (with variations to damp undesired dynamics), while the reeling of conductive cables 302 maintains the local departure elevation angle in the ~6-10 degree range (e.g., reel angle B of FIG. 14), and also damps the conductive cable dynamics.

Replacing one large winch that is built or placed on site with two or more smaller winches or sub-assemblies that are each small enough to be transported in a "road-legal trailer" may significantly reduce transportation, installation, and maintenance/repair costs.

Figure 6:
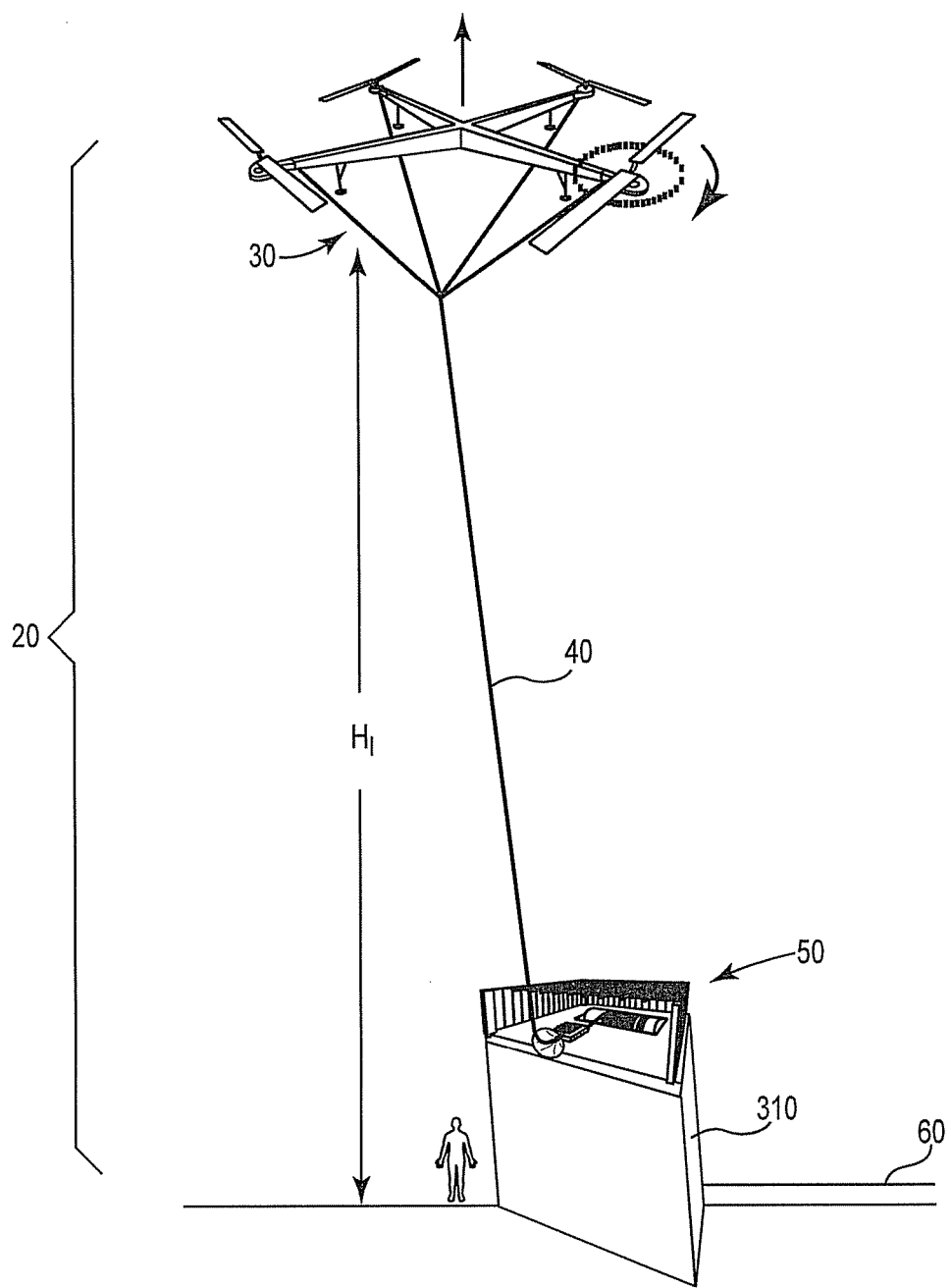
FIG. 6 is a perspective view of a power generation system deployed from an elevated winch assembly according to one embodiment.

FIG. 6 is a perspective view of one embodiment of power generation system 20 including winch assembly 50 mounted on a pillar 310 that elevates the high voltage electricity conductors 302 (FIG. 4) out of reach of pedestrians. It is to be understood that one embodiment of winch assembly 50 includes the three separate winches described above and illustrated in FIG. 5.

Airborne electricity generator 30 (generator 30) is illustrated flying at a first deployment altitude H1. In one embodiment, the deployment altitude H1 is between approximately 40,000-50,000 feet and generator 30 draws electricity from grid 60 to power generator 30 up to the deployment altitude H1. With one operational scheme, clamping assembly 212 (FIG. 3B) clamps against tether assembly 40 as generator 30 flies at the deployment altitude H1. In this sense, generator 30 is "planted" at the deployment altitude H1. Thereafter, generator 30 transitions to an electricity-generating attitude at an altitude of H2 in which generator 30 is tilted at an angle of attack into the oncoming wind as illustrated in FIG. 7.

Figure 7:
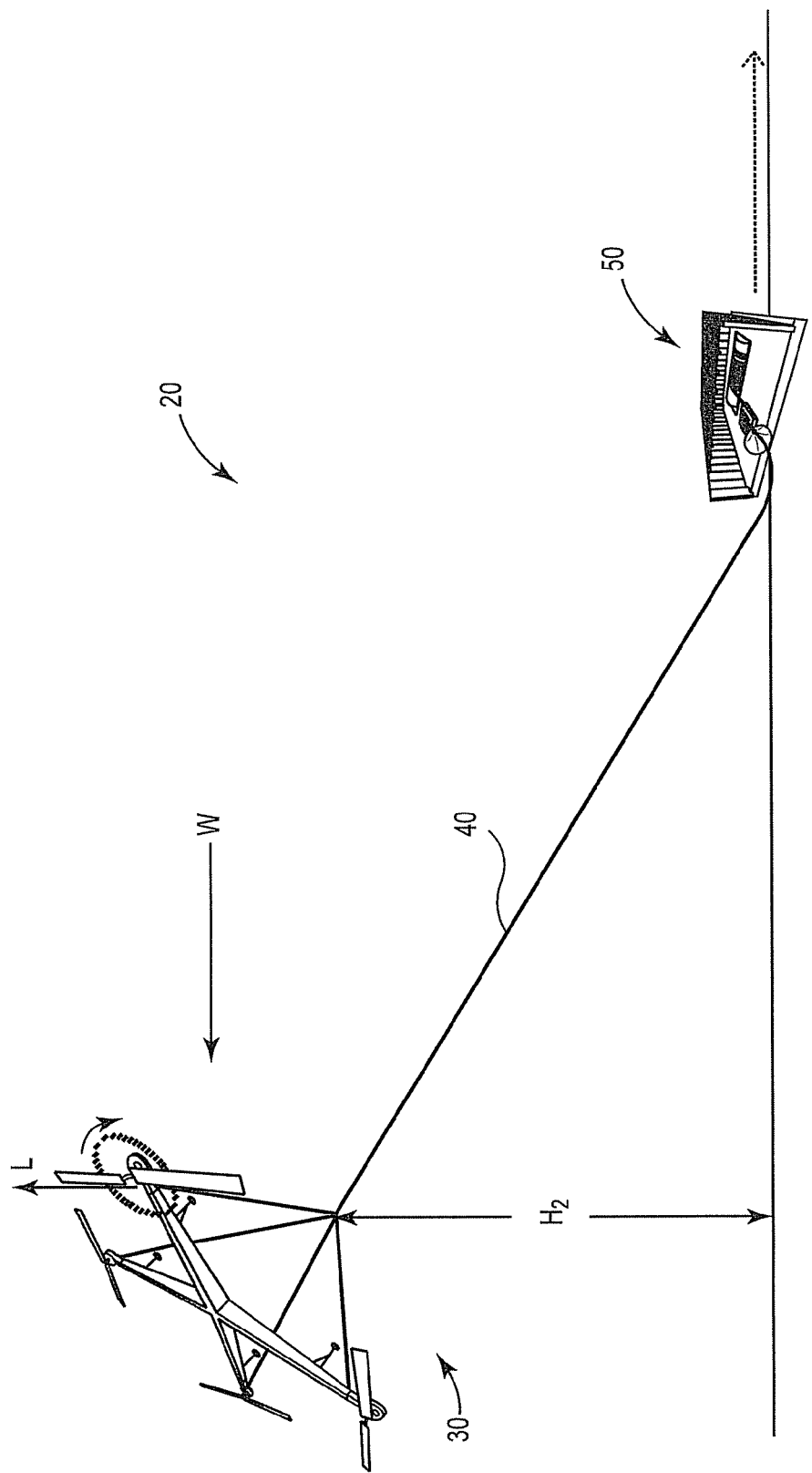
FIG. 7 is a perspective view of one embodiment of the power generation system illustrated in FIG. 1 including the airborne electricity generator deployed in an electricity generating configuration.

FIG. 7 is a perspective view of generator 30 transitioned to an electricity-generating attitude at an altitude H2 that is generally less than the deployment altitude H1 according to one embodiment. One deployment methodology provides powering generator 30 to electricity-generating altitude H1 (FIG. 6) and subsequently transitioning generator 30 to altitude H2 in a manner that minimizes tension applied to tether assembly 40 during reeling.

In one embodiment, generator 30 flies at an angle of attack into the oncoming wind stream W at an altitude H2 that is up to 35,000 feet. One deployment methodology for generator 30 includes powering generator 30 such that the vehicle orients itself to climb nearly straight up at a zenith angle of approximately 90 degrees by adjusting lift and control of rotors 114 to account for local wind conditions. Over the first kilometer, generator 30 is flown in a nearly horizontal configuration. It is expected that there will be wind aloft such that generator 30 may be expected to drift downwind. Tether assembly 40 is spooled off of drum 52 fast enough to keep all three cables (cable 300 and two conductors 302) nearly horizontal relative to transition assembly 202 (FIG. 3A). Maintaining the lowest safe cable departure angles near the winch minimizes tension and hence allows faster climbing at less power than with higher cable angles and tension. In addition, by maximizing sag, it allows moderately more cable deployment for a given rotorcraft distance from the winch.

In one embodiment, traction drives 210 (FIG. 3B) are employed to maintain the tension in the tether assembly 40 at a lower tension condition than the tension of cables 300, 302 as they are spooled onto drum 52. During ascent, generator 30 is pitched to limit zenith elevation angles to between approximately 45-70 degrees throughout the deployment. When generator 30 reaches deployment altitude H1 (FIG. 6), clamping assembly 212 clamps tether assembly 40 at the desired length and generator 30 is pitched to increase the load on cable 300. Thereafter, conductive cables 302 are clamped when their excess length sags to an equilibrium length with cable 300. Gradually, generator 30 is pitched so it drifts further downwind as power (and tension) in tether assembly 40 is ramped up.

The deployment methodology embodiments illustrated in FIGS. 6-7 provide relatively low-tension on the tether assembly 40 in comparison to directly flying generator 30 against the oncoming wind for the entirety of its outward deployment.

Another deployment methodology embodiment provides flying generator 30 at an angle of attack into the oncoming wind stream W from its landing pad near the surface of the Earth upward and directly to the altitude H2. This deployment methodology embodiment exerts a higher tension on tether assembly 40 as compared to the methodology of FIGS. 6-7 since tether assembly 40 supports both the weight of tether assembly 40 and the aerodynamic forces of generator 30 as they are spooled from drum 52.

Figure 8:
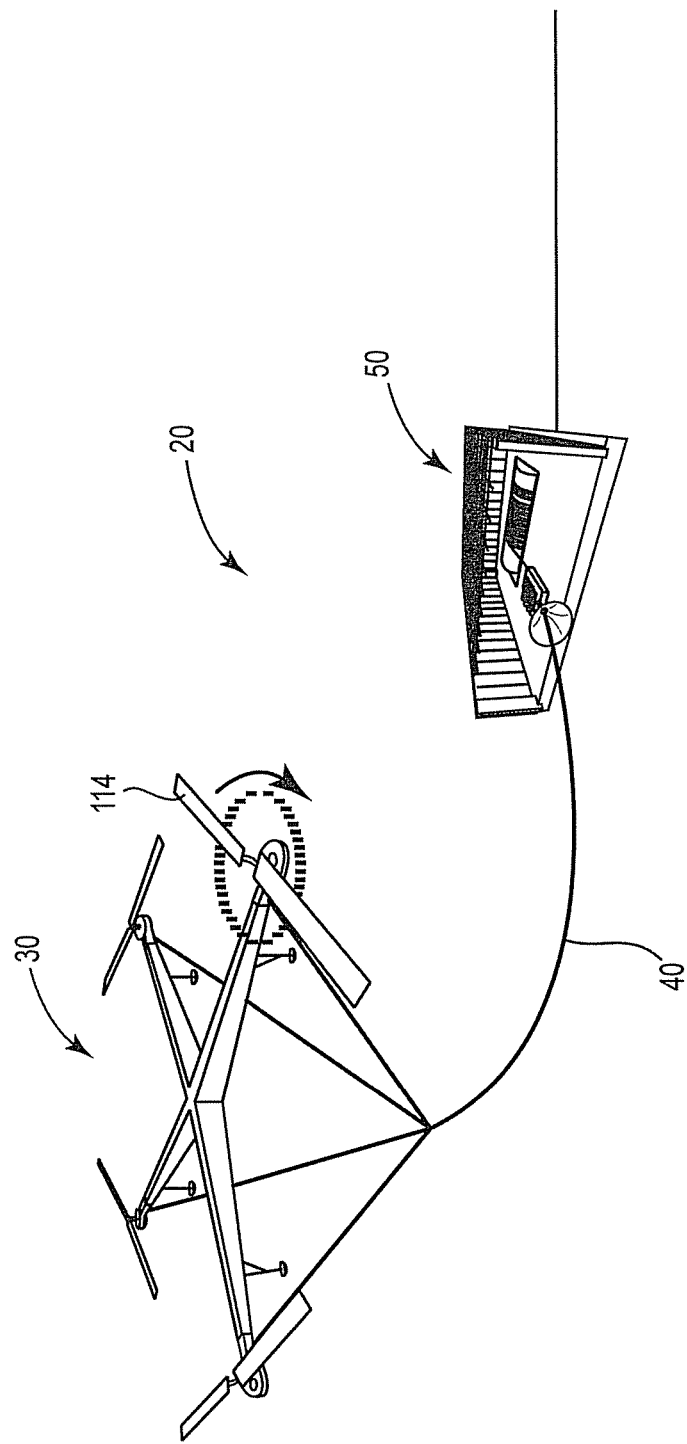
FIG. 8 is a perspective view of the airborne electricity generator illustrated in FIG. 7 autorotating to a landing site according to one embodiment.

FIG. 8 is a perspective view of generator 30 returning to its landing site. In one embodiment, rotors 114 on generator 30 are operated in an autorotation mode as generator 30 descends from altitude H2 (FIG. 7) to the ground. In one embodiment, autorotation enables controlled descent of generator 30 and is characterized by an upward flow of air through rotors 114 that enables rotors 114 to rotate at substantially their normal speed as generator 30 descends. Rotors 114 autorotate to balance the aerodynamic forces, which enables generator 30 to "glide" to the ground as rotors 114 glide in their rotational plane. In one embodiment, the desired flight envelope for generator 30 includes a powered climb to altitude H1, a transition from altitude H1 to altitude H2, followed by autorotation from altitude H2 back to the landing site, as best illustrated in FIGS. 6-7.

In one embodiment, generator 30 is controlled to fly in a figure-eight pattern during autorotative descent to ensure a proper glide path without gliding too far up range. It is desirable to provide generator 30 with an unpowered landing capability in the case of cable or electrical failure. To this end, one embodiment of system 20 includes a programmed autopilot mechanism that controls airborne electricity generator 30, tether assembly 40, and winch assembly 50 to enable autorotation during landing that maintains a gliding descent until it is time to flare generator 30 and settle on the ground. In one embodiment, disk loading at landing is approximately 0.5 pounds per square foot so that the autorotative descent rate is low. It is expected that ground effects will start at approximately one hundred feet above ground. The combination of low disk loading, low descent rates, four close-spaced large-diameter rotors, and a total rotorcraft mass that is only a modest multiple of the rotor masses enables a more controlled and gentle autorotative landing, with better control of landing location, than is generally feasible with conventional rotorcraft.

Figure 9:
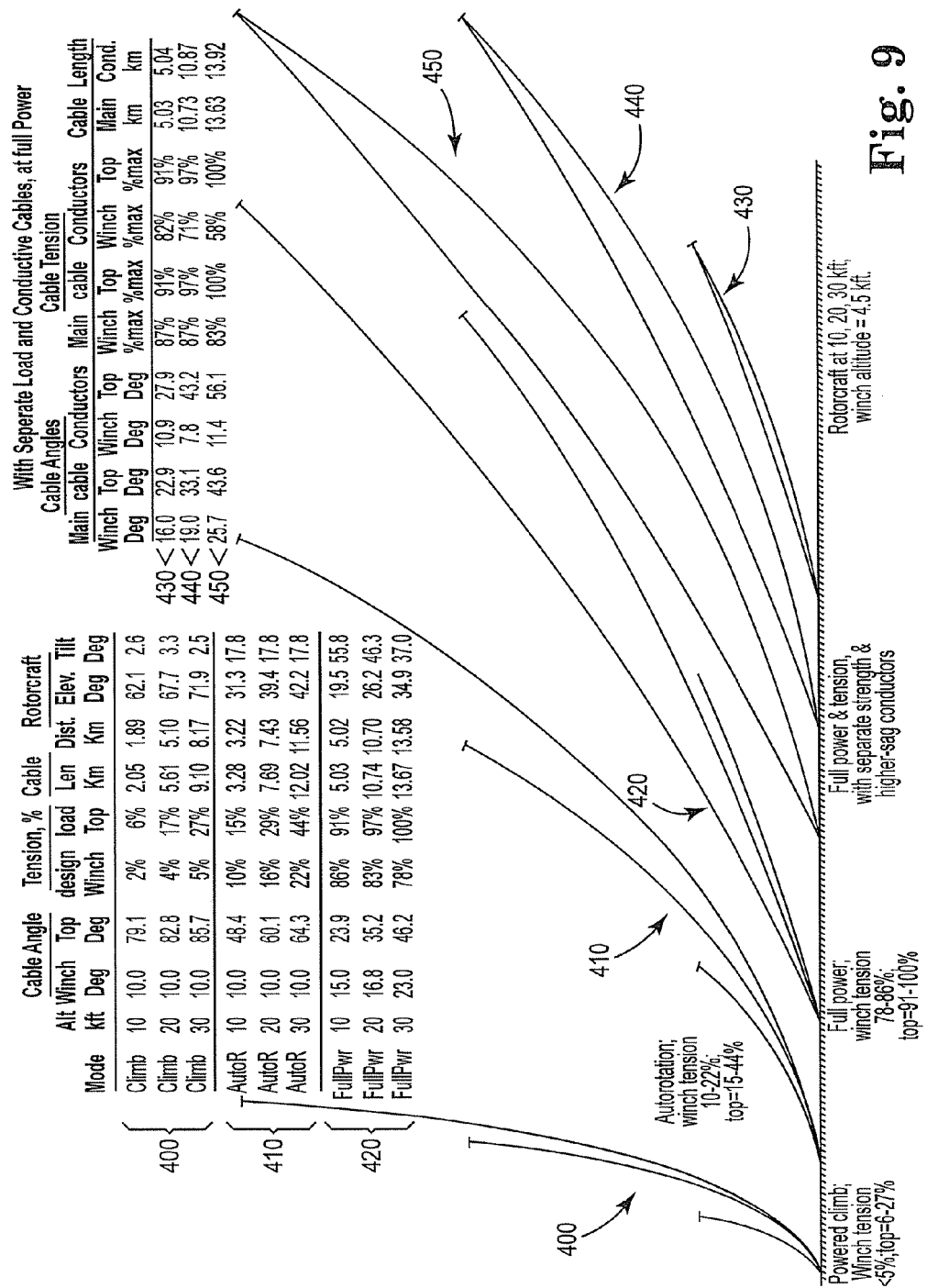
FIG. 9 is a chart illustrating relative cable deployment angle and cable profiles for various airborne electricity generator elevations and distances according to one embodiment.

FIG. 9 is a chart of example profiles for one embodiment of tether assembly 40 under various flight configurations of generator 30. For deployment altitudes between 10,000-30,000 feet, data set 400 (representing a powered climb) results in the lowest calculated tension at the winch and at the first end portion 42 (FIG. 1) of the tether assembly 40. For example, power climbing to 30,000 feet results in generator 30 having a deployed distance of 8.17 km at a zenith angle elevation of 71.9 degrees, with a winch design load of less than 5% and a cable loading at top end portion 42 of tether assembly 40 of approximately 27%.

Data set 410, representing autorotative descent from 30,000 feet, results in generator 30 being retracted from a deployed distance of 11.56 km down from a zenith angle elevation of 42.2 degrees with a winch design load of between 10-22% and a cable loading at top end portion 42 of tether assembly 40 of approximately 44%.

Data set 420, represents full power operation at up to 30,000 feet, and results in generator 30 having a deployed distance of 13.58 km at a zenith angle elevation of 34.9 degrees and a winch design load of between 78-86% and a cable loading at top end portion 42 of tether assembly 40 of between approximately 91-100%.

Embodiments are configured to reduce the tension at the winch, as a fraction of design load, when reeling cable in or out. Powered climb allows much lower winch tensions for any given cable length. Autorotative descent, with the rotorcraft pitched down (tilted into the wind), allows cable geometries and tensions similar to those in powered climb, unlike autorotative station keeping or climbing, which pitches the rotorcraft up and involve significantly higher tensions and larger rotorcraft downrange distances.

Data sets 430, 440, 450 represent deployment angles and tensions for cable 300 and conductors 302 for a range of winch degrees between 16-26 degrees.

FIG. 9 thus illustrates that the powered climb flight methodology embodiments produce low tension at winch assembly 50 and along tether assembly 40 as the generator 30 pulls tether assembly 40 off of reel 52. Powered climb with high elevation angle for generator 30 as viewed from the winch assembly 50 provides for the lowest winch tensions during deployment.

In one embodiment, after deployment to the altitude H1, the transition from powered flight to autorotative flight in moving generator 30 to altitude H2 is delayed until most of cable assembly 40 has been deployed. It is believed that the transition from powered flight to autorotative flight can be smoother when the generator 30 has good wind speed (which may be acquired through maneuvering generator 30). The further downwind generator 30 flies, the higher the cable tension at the winch, so it is desirable to delay the transition until most of the cable has been deployed, or until the full desired lengths of cables 300, 302 are deployed.

Figure 10:
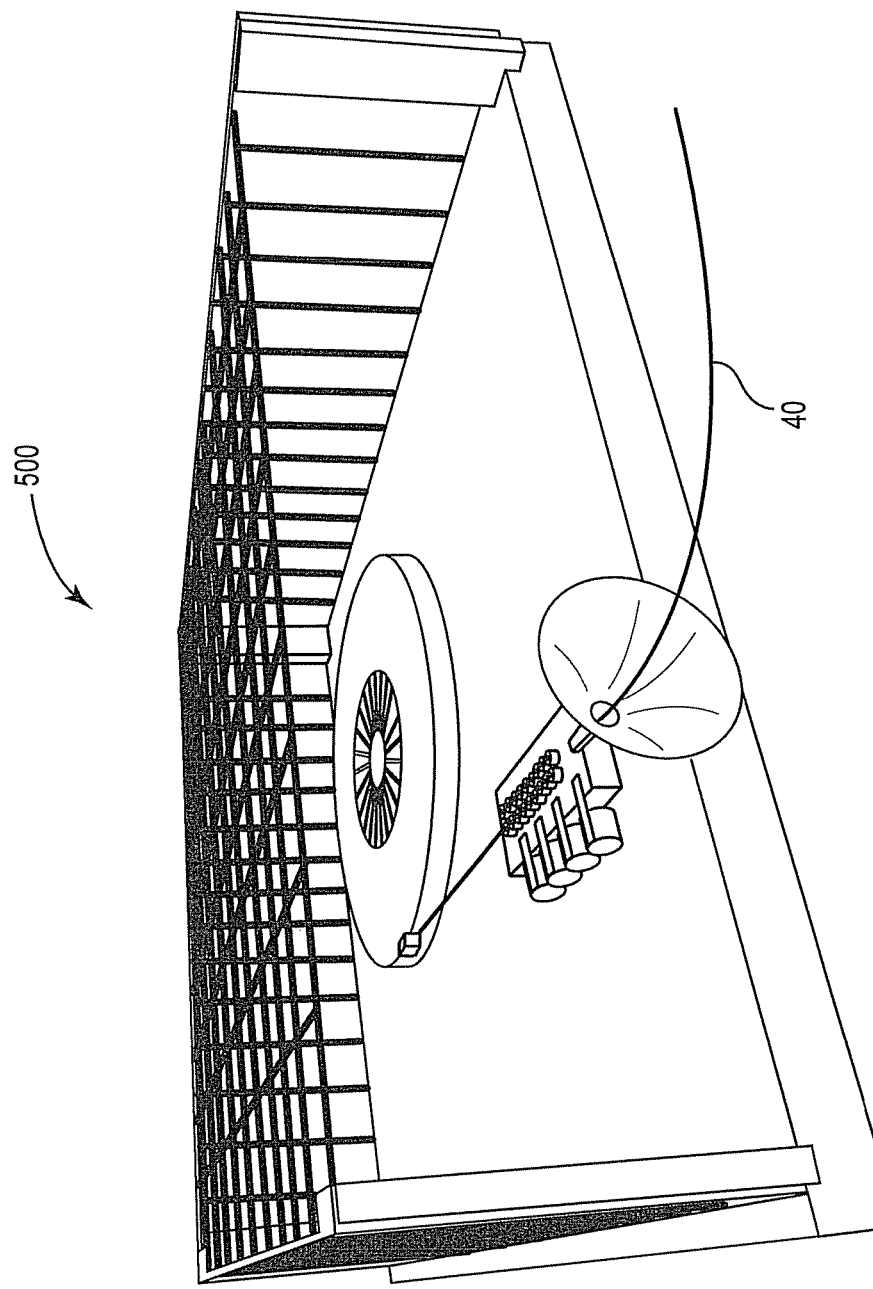
FIG. 10 is a perspective view of a winch assembly including a winding carousel according to one embodiment.

FIG. 10 is a perspective view of a winch assembly 500 according to another embodiment. Winch assembly 500 includes a table and a transition assembly similar to the table 200 and the transition assembly 202 illustrated in FIG. 3A employed with a carousel reel mechanism 502. Reel mechanism 502 provides low-profile and controlled tension winding of tether assembly 40, but in some embodiments is potentially too large to be transported on the interstate highway system when other traffic is present.

Figure 11:
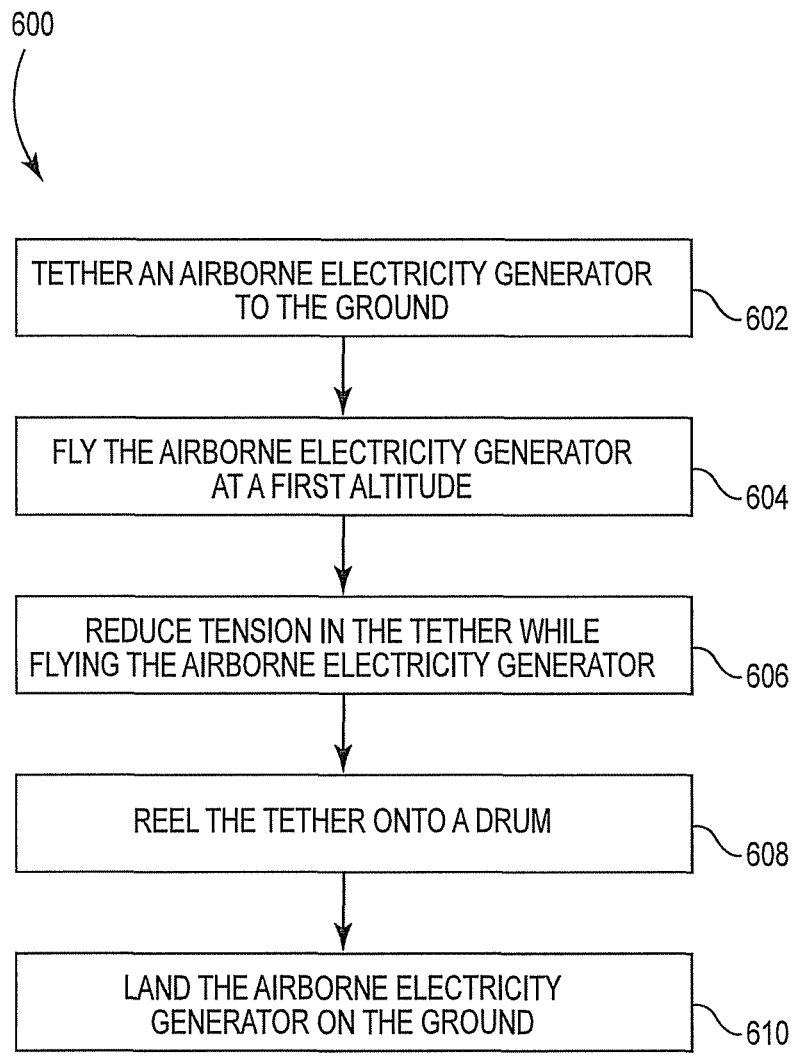
FIG. 11 is a flow diagram of a method of handling a tether coupled to an airborne electricity generator according to one embodiment.

FIG. 11 is a flow diagram 600 of one embodiment of a method of handling a tether coupled to an airborne electricity generator. The method includes tethering an airborne electricity generator to the ground at 602. At 604, the airborne electricity generator is flown to a first altitude. At 606, tension in the tether is reduced while flying the airborne electricity generator. At 608, the tether is reeled onto a drum, and at 610 the airborne electricity generator is landed on the ground.

Figure 12:
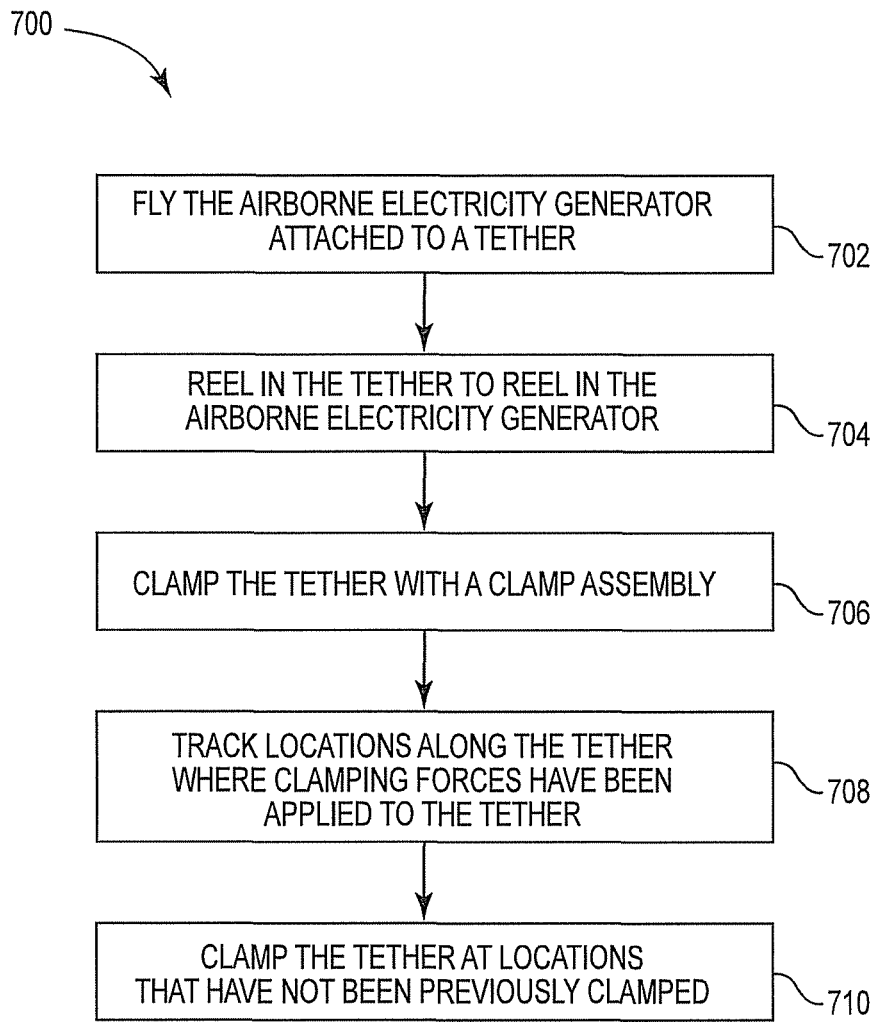
FIG. 12 is a flow diagram of a method of minimizing wear on a tether coupled to an airborne electricity generator according to one embodiment.

FIG. 12 is a flow diagram 700 of a method of minimizing the wear imparted to a tether attached to an airborne electricity generator according to one embodiment. The method includes flying an airborne electricity generator attached to a tether at 702. At 704, the tether is reeled in to reel in the airborne electricity generator. At 706, the tether is clamped with a clamp assembly. At 708, clamping locations along the tether where clamping forces had been applied are statistically tracking locations. At 710, the tether is clamped at locations that have not been previously clamped, in a manner that minimizes wear imparted to the tether.

In one embodiment, the cable is made in several discrete lengths, with a field joint that is provided as a clamping point. Clamping is preferentially applied to the field joint section, which in one embodiment is replaceable. In one embodiment, the field joint is formed of a hardened material configured to withstand repeated clampings. At any given time, there will be both an optimum flight altitude and cable length. Modest variations on either or both of these variables will generally impose performance penalties that are low. For example, this enables clamping at discrete intervals, around perhaps one kilometer intervals between clamping points.

Figure 13:
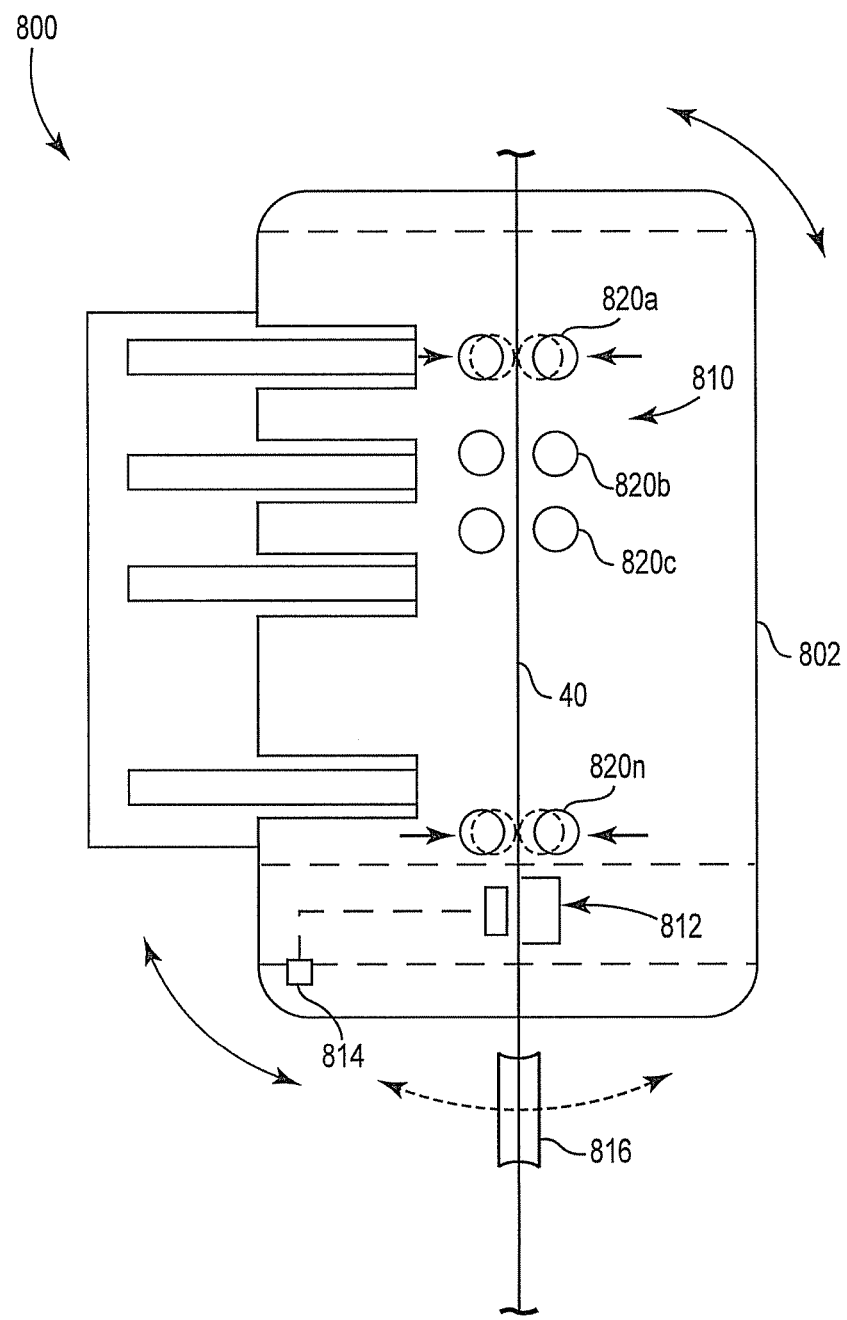
FIG. 13 is a top view of one embodiment of a table of a winch assembly for handling a tether assembly attached to an airborne electricity generator.

FIG. 13 is a top view of one embodiment of a winch assembly 800 for handling tether assembly 40 that is attached to an airborne electricity generator as described above. Winch assembly 800 includes a table 802 maintaining a traction drive 810 for reeling tether assembly 40, a clamping assembly 812 for securing tether assembly 40, a controller 814 communicating with clamping assembly 812, and a swiveling pulley 816 configured to guide tether assembly 40 to the winch assembly 800. Traction drive 810 is configured to adjust and minimize tension within tether assembly 40, and controller 814 and clamp 812 are provided to monitor and evenly distribute physical wear applied to tether assembly 40.

In one embodiment, traction drive 810 includes multiple pairs of rotating drums 820a, 820b, 820c, . . . 820n (drums 820) that are configured to reel tether assembly 40 relative to a collection spool without bending tether assembly 40. In one embodiment, drums 820 include air-filled tires that are individually movable laterally under a selected but variable force to pinch tether assembly 40 between each pair of drums 820. The pathway of tether assembly 40 is substantially linear (i.e., characterized by an absence of bends or reversals) as the rotating tires/drums 820 reel tether assembly 40 onto or off of winch assembly 800. In one embodiment, tires/drums 820 include a grooved tread that is configured to engage or wrap around tether assembly 40 as the air-filled tires flatten against each other.

In one embodiment, clamp 812 is configured as a current contact when tether assembly 40 is clamped in a high-tension high-power configuration. During reeling, the current contact is provided by a low-tension inboard metal pulley, which in one embodiment is located adjacent to drum 52 (FIG. 3).

Pulley 816 is disposed outboard of table 802 and provides a transition assembly that is configured to adjust an angle of tether assembly 40 relative to table 802. In one embodiment, pulley 816 swivels to provide directional tracking for tether assembly 40. Pulley 816 is configured to minimize the friction applied to tether assembly 40 by limiting the contact area between pulley 816 and tether assembly 40. In one embodiment, pulley 816 includes a single pulley having a diameter between approximately 6-12 feet. Other forms of pulley 816, including pulleys having wear-resistant coatings and current-conducting coatings, are also acceptable.

FIG. 14 is a schematic diagram generally illustrating power generation system 20 including tether assembly 40 attached between airborne electricity generator 30 and winch assembly 50, according to one embodiment. In operation, when generator 30 is climbing to a deployment altitude (e.g., deployment altitude H1 of FIG. 6), in autorotation mode and descending to an electricity-generating altitude (e.g., electricity generating altitude H2 of FIG. 7), operating under full power at an electricity generating altitude, or is being retrieved with generator 30 under power or in autorotation mode, a top angle C is present between first end 42 of tether assembly 40 and horizontal, a winch assembly angle A is present between tether assembly 40 and horizontal at transition assembly 202 (e.g., a pulley), and a reel angle B is present between tether assembly 40 and table 200. As described above, winch assembly angle A, reel angle B, and top angle C are sometimes referred to herein using different terms. In particular, with reference to FIG. 9, winch assembly angle A and top angle C are respectively referred to in the tables of FIG. 9, under the heading of "Cable Angle," as "Winch" and "Top". Winch assembly angle C is also referred to as a "cable departure angle," and reel angle B is referred to as "level-wind reel angle."

Although indicated in FIG. 14 as being positioned on the "inboard" side of transition assembly 202, in other embodiments, clamping assembly 212 may be positioned on the "outboard" side of transition assembly 202, as indicated by the dashed rectangles. It is noted that when on the outboard side of transition assembly 202, clamping assembly 212 is configured to rotate vertically so as to adjust its zenith angle, as indicated by the double arrow.

According to one embodiment, a rate at which drum 52 reels in or reels out tether assembly 40 is based on maintaining winch assembly angle A at a desired value. For example, when reeling in generator 30, if the value of winch assembly angle A is greater than the desired value, the rate at which drum 52 reels in tether assembly 40 is decreased. Likewise, when reeling in generator 30, if the value of winch assembly angle A is less than the desired value, the rate at which drum 52 reels in tether assembly 40 is increased. By maintaining winch assembly angle A at the desired value, both when reeling in and reeling out tether assembly 40, stress on tether assembly 40 can be minimized.

In summary, winching tethers, cables, or conductors under high tension can potentially degrade the cables. Winching long and/or heavy electrical cables can necessitate the use of complex and powerful fraction drive machinery. Embodiments described above provide systems and methods for limiting tension in cables, including electrical tether-style cables, during winching that greatly reduces cable wear and the risk of breaking of the cable during winching. Some embodiments provide a clamping assembly configured to clamp the tether assembly outboard of the winch whenever the tether assembly is in a high tension power generating mode. Retrieval methodology embodiments provide autorotation of the airborne electricity generator when retrieving tether assembly to minimize tension in the cables.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A power generation system comprising:
    an airborne electricity generator;
    a tether assembly configured to carry electricity between the airborne electricity generator and ground, the tether assembly including a first end portion coupled to the airborne electricity generator; and
    a ground-based winch assembly including a transition assembly and a drum onto which the tether assembly is reeled, wherein the transition assembly is configured to adjust a winch to maintain a reel angle at which the tether assembly is reeled onto the drum in a range between 0 and 10 degrees.

2. The power generation system of claim 1, wherein the winch assembly comprises a table mounted outboard of the drum, the transition assembly communicating with the table, wherein the reel angle is between the tether assembly and the table.

3. The power generation system of claim 2, wherein the table comprises a clamping assembly configured to clamp the tether assembly at a clamping location between the drum and the first end portion.

4. The power generation system of claim 3, wherein the winch assembly comprises a controller having memory, the controller configured to record and the memory configured to store/recall a clamping location of the clamping assembly against the tether assembly.

5. The power generation system of claim 3, wherein the clamping assembly is configured to immobilize the tether assembly to maintain the airborne electricity generator at a flight altitude and enable one of replacement of the drum and replacement of a portion of the tether assembly.

6. The power generation system of claim 2, wherein the transition assembly is configured to orient the first end portion of the tether assembly at a zenith angle of between approximately 10-90 degrees.

7. The power generation system of claim 2, wherein the transition assembly is configured to orient the tether assembly through azimuth angles of between approximately 0-270 degrees.

8. The power generation system of claim 2, wherein the winch assembly includes a dashpot to dampen dynamics of the tether assembly.

9. The power generation system of claim 1, wherein the tether assembly comprises a first cable configured to carry electricity from the generator to land, a second cable configured to carry electricity from the generator to land, and a third cable, the first and second cable electrically isolated from each other and the third cable.

10. The power generation system of claim 9, wherein the winch assembly comprises:
    a first winch assembly configured to reel the first cable onto a first drum;
    a second winch assembly configured to reel the second cable onto a second drum; and
    a third winch assembly configured to reel the third cable onto a third drum;
    wherein the first and second winch assemblies reel independently of each other and the third winch assembly.

11. The power generation system of claim 1, wherein the airborne electricity generator is configured to power climb and extend the tether assembly to a deployed altitude as the winch assembly feeds the tether assembly off the drum.

12. The power generation system of claim 11, wherein the airborne electricity generator is controlled to power climb in a near vertical fashion to deploy a length of tether assembly which is in a range of approximately 1.2 to 1.6 times greater than a desired power generating elevation relative to an elevation of the winch assembly.

13. The power generation system of claim 12, wherein the airborne electricity generator comprises an angle of attack of between approximately 20-70 degrees at the power generating altitude.

14. The power generation system of claim 1, wherein the airborne electricity generator is configured to substantially autorotate upon descent to enable the winch assembly to retract the tether assembly.

15. The power generation system of claim 14, wherein the airborne electricity generator is configured to substantially autorotate to descend to lower the first end portion of the tether assembly as the winch assembly retracts the tether assembly.

16. The power generation system of claim 14, wherein the airborne electricity generator is configured to substantially autorotate upon descent to enable the winch assembly to reel the tether assembly onto the drum of the winch assembly at an approximately level reel angle.

* * * * *